US012032406B2

(12) United States Patent
Schwager et al.

(10) Patent No.: US 12,032,406 B2
(45) Date of Patent: Jul. 9, 2024

(54) EDGE-TO-EDGE DISPLAY MODULE

(71) Applicant: Dell Products L.P., Round Rock, TX (US)

(72) Inventors: Mark A. Schwager, Cedar Park, TX (US); Laurent Andrew Regimbal, Georgetown, TX (US); HongJi Huang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 17/369,632

(22) Filed: Jul. 7, 2021

(65) Prior Publication Data
US 2023/0011051 A1  Jan. 12, 2023

(51) Int. Cl.
*G02F 1/1333* (2006.01)
*G06F 1/16* (2006.01)
*H04N 23/57* (2023.01)

(52) U.S. Cl.
CPC ...... *G06F 1/1637* (2013.01); *G02F 1/133314* (2021.01); *G06F 1/1686* (2013.01); *G02F 2202/28* (2013.01); *G06F 1/1616* (2013.01); *H04N 23/57* (2023.01)

(58) Field of Classification Search
CPC .............. G06F 1/1637; G06F 1/1686; G02F 1/133314; G02F 1/133354; G02F 1/133322; G02F 1/133325; G02F 1/133
See application file for complete search history.

(56) References Cited

U.S. PATENT DOCUMENTS

| | | | | |
|---|---|---|---|---|
| 6,894,757 B2 * | 5/2005 | Ha | ..................... | G02F 1/133308 349/110 |
| 7,245,333 B2 * | 7/2007 | Nam | ..................... | G02F 1/1333 349/110 |
| 7,933,123 B2 * | 4/2011 | Wang | ..................... | G06F 1/1656 361/752 |
| 8,253,875 B2 * | 8/2012 | Kim | .................. | G02F 1/133615 349/67 |
| 8,395,722 B2 * | 3/2013 | Mathew | ................ | G06F 1/1658 349/56 |
| 8,467,177 B2 | 6/2013 | Mathew et al. | | |

(Continued)

FOREIGN PATENT DOCUMENTS

KR  20140062852 A  5/2014

OTHER PUBLICATIONS

U.S. Appl. No. 16/938,322, filed Jul. 24, 2020, entitled "Information Handling System Edge-to-Edge Display," by inventors Laurent Andrew Regimbal and Glenn Chiappe.

*Primary Examiner* — Nidhi Thaker
(74) *Attorney, Agent, or Firm* — ZAGORIN CAVE LLP; Robert W. Holland

(57) ABSTRACT

A portable information handling system housing integrates a display having an edge-to-edge presentation of visual images at a housing portion with an inactive portion of a display panel along a perimeter of the display supported by a backplate flange extension region that extends from a backlight outer perimeter associated with an active area of the display panel to the perimeter of the housing portion. Openings formed in the backplate extension flange region provide access for sensors through the display panel inactive area with backlight illumination leakage to the opening blocked by optically dense adhesive.

13 Claims, 13 Drawing Sheets

(56) References Cited

U.S. PATENT DOCUMENTS

| | | | |
|---|---|---|---|
| 8,866,989 B2* | 10/2014 | Mathew | G06F 1/1637 349/58 |
| 9,069,525 B2* | 6/2015 | Mathew | G02F 1/13454 |
| 9,188,800 B2* | 11/2015 | Yu | G02F 1/133308 |
| 9,372,505 B2 | 6/2016 | Mathew et al. | |
| 9,575,354 B2 | 2/2017 | Mathew et al. | |
| 9,690,129 B1* | 6/2017 | Won | G02F 1/133308 |
| 10,353,432 B2 | 8/2019 | Mathew et al. | |
| 10,599,190 B2 | 3/2020 | Nakamura | |
| 10,728,371 B2* | 7/2020 | Kwon | G06F 1/1686 |
| 2001/0035923 A1* | 11/2001 | Cha | G02F 1/133308 349/65 |
| 2006/0176417 A1* | 8/2006 | Wu | G02F 1/136277 349/58 |
| 2008/0036942 A1* | 2/2008 | Hsieh | G02F 1/133608 362/633 |
| 2008/0291356 A1* | 11/2008 | Kim | G02F 1/133608 362/633 |
| 2009/0237602 A1* | 9/2009 | Kubota | G02F 1/1335 349/122 |
| 2009/0262277 A1* | 10/2009 | Kim | H05K 1/147 349/187 |
| 2010/0164920 A1 | 7/2010 | Shimoharada | |
| 2010/0302478 A1* | 12/2010 | Nakagawa | G02B 6/0091 349/62 |
| 2010/0315570 A1* | 12/2010 | Mathew | G06F 1/1637 257/E27.111 |
| 2011/0103041 A1* | 5/2011 | Mathew | G06F 1/1616 362/97.3 |
| 2013/0258234 A1* | 10/2013 | Park | G02F 1/133528 349/58 |
| 2014/0160085 A1 | 6/2014 | Rabii et al. | |
| 2014/0183342 A1 | 7/2014 | Shedletsky et al. | |
| 2015/0271371 A1 | 9/2015 | Vogel et al. | |
| 2015/0286089 A1 | 10/2015 | Soejima | |
| 2015/0301402 A1 | 10/2015 | Kimura et al. | |
| 2017/0068027 A1 | 3/2017 | Powell | |
| 2017/0124372 A1* | 5/2017 | Evans, V | G06F 1/1684 |
| 2018/0067212 A1 | 3/2018 | Wilson et al. | |
| 2020/0162804 A1* | 5/2020 | Lee | H04R 1/028 |
| 2020/0266845 A1* | 8/2020 | Kumar | G06F 1/1688 |
| 2020/0382739 A1 | 12/2020 | Lu et al. | |
| 2021/0149441 A1 | 5/2021 | Bartscherer | |
| 2021/0168230 A1 | 6/2021 | Baker et al. | |
| 2021/0337052 A1* | 10/2021 | Zhang | G06F 1/1626 |
| 2023/0008336 A1 | 1/2023 | Schwager | |
| 2023/0010653 A1 | 1/2023 | Schwager | |

* cited by examiner

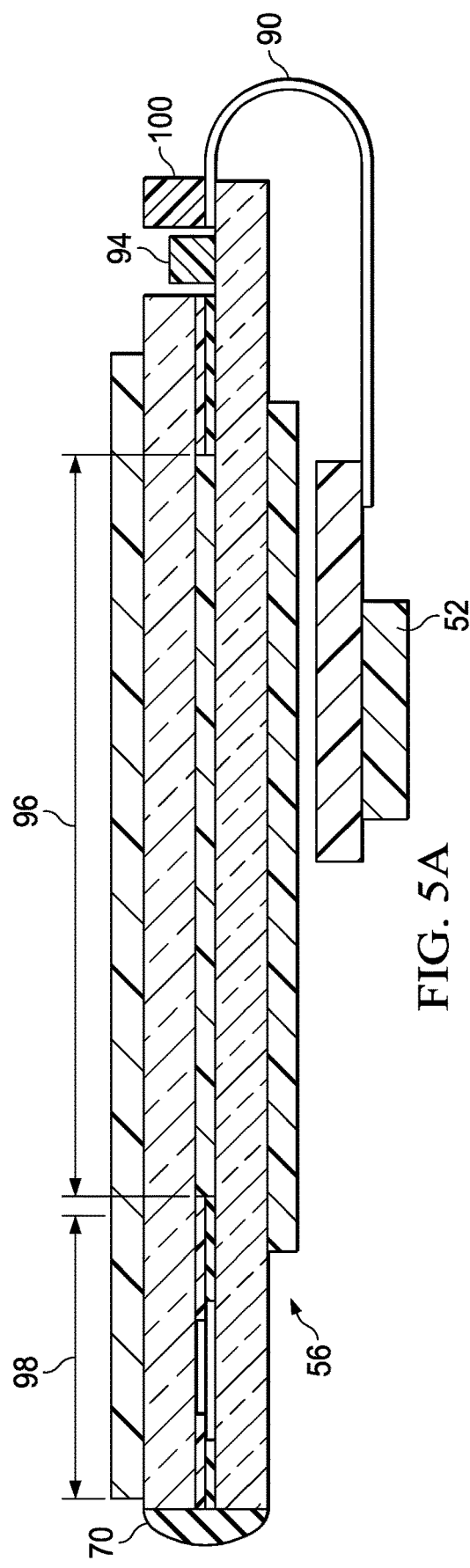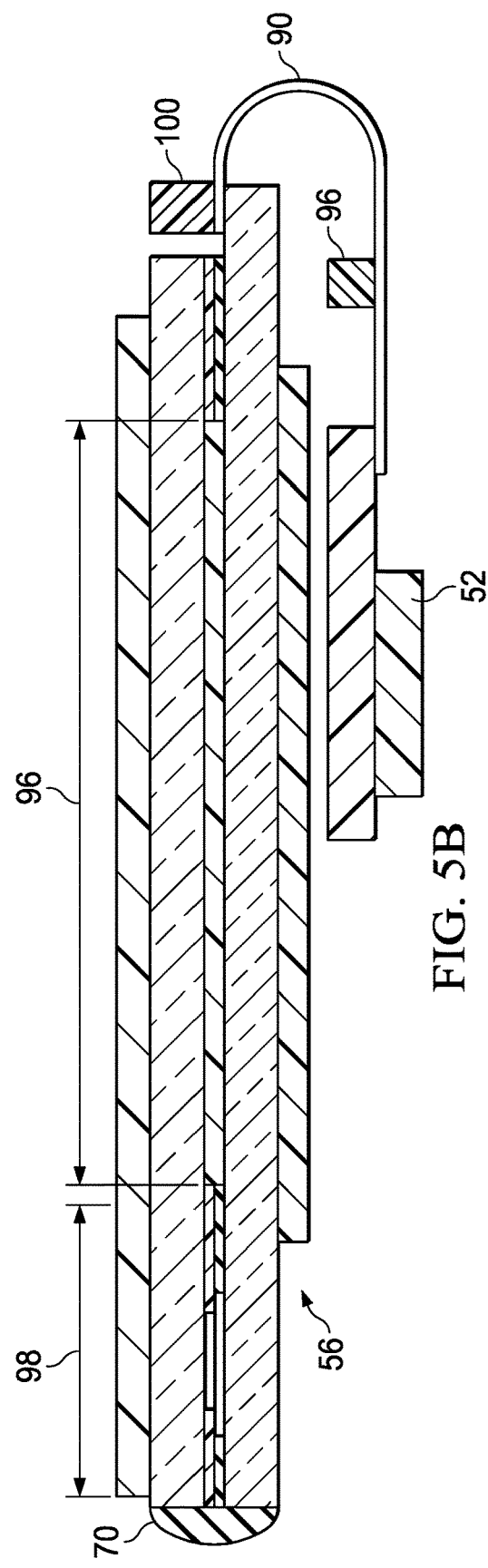

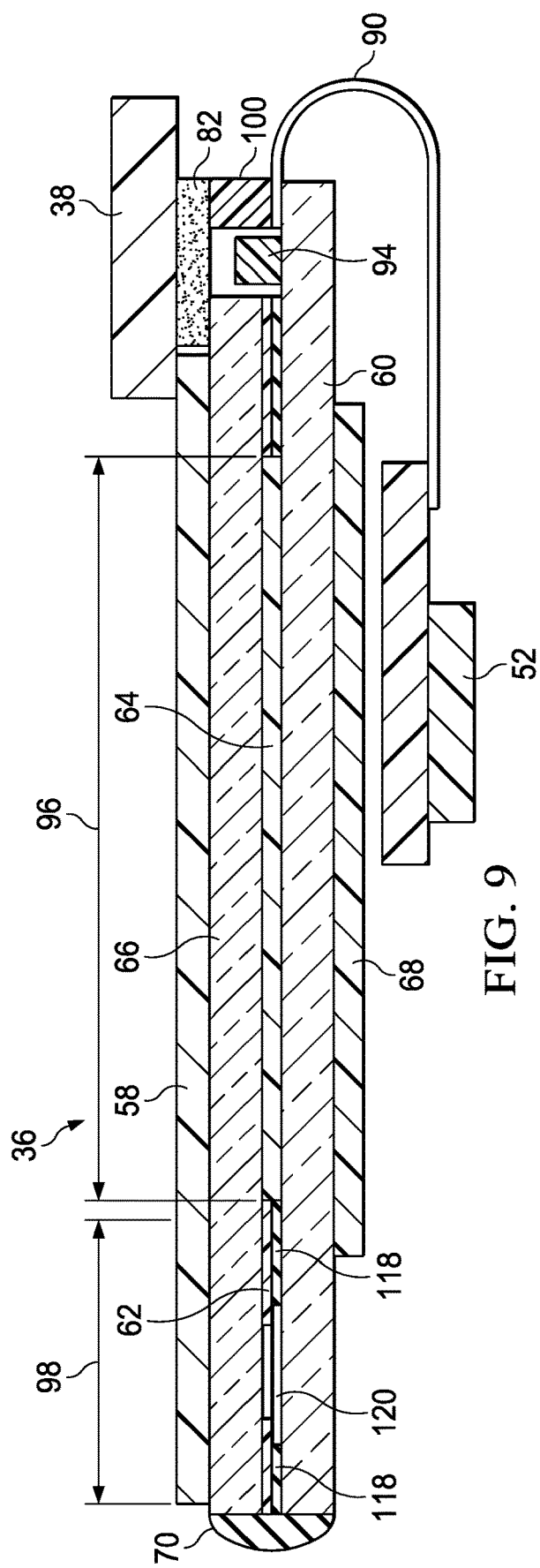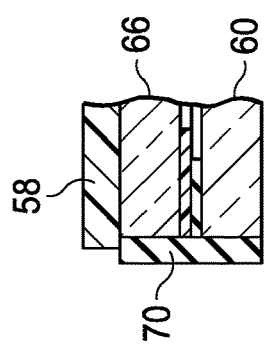

EDGE-TO-EDGE DISPLAY MODULE

BACKGROUND OF THE INVENTION

Field of the Invention

The present invention relates in general to the field of portable information handling system displays, and more particularly to an information handling system edge-to-edge display module.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility. In some instances, convertible information handling systems have a display coupled to both housing portions so that one display presents a keyboard that accepts typed inputs. Such dual display systems rotate the housing portions 180 degrees to provide a tablet mode with visual information presented across both displays.

Generally, the width and height dimensions of a portable information handling system are driven by the size of the display integrated in a portable housing. Typically, the display is assembled into a housing and then the perimeter of the display is protected by a bezel coupled to the housing perimeter and extending over the display perimeter. A disadvantage of this approach is that the display assembly into the housing tends to increase the height and width of the housing relative to the dimensions of the display. In contrast, and edge-to-edge (E2E) system extends the display to the housing perimeter without having a bezel placed around the display perimeter. In some instances, edge-to-edge systems couple the display to the housing with a bonding process that uses a clean room for assembly at a significant increase in cost. This assembly includes a number of complexities, such as integration of touch sensors in a cover glass placed over the display and placement of integrated devices like cameras, infrared cameras, ambient light sensors and user presence detection sensors. Touch detection integrated in a glass layer over top of a display panel is referred to as On-cell touch technology. Recently, touch detection integrated in the display panel, known as In-cell technology, has been introduced.

The introduction of In-cell touch detection that integrates with a display panel instead of a cover glass has offered an opportunity for decreasing the thickness of a portable information handling system. With touch detection integrated in the display panel, a separate cover glass placed over the display panel may be omitted, such as by using a top polarizer as the display outer surface. One difficulty with this approach is that the outer polarizer surface may interfere with sensors and devices that accept light from underneath the outer surface. Another difficulty is that display glass covers typically offer increased structural integrity, such by using treated glass like Gorilla glass. When a polarizer is used as the display outer layer without an overlying cover glass, the housing tends to be less robust both for protecting the display and for coupling to a hinge of a convertible information handling system. In addition, assembly of the display panel at the housing can permit illumination from a backlight of the display to escape along the perimeter of the housing, thus disrupting viewing of the display. Illumination from the backlight may also interfere with the operation of sensors and other devices that integrate in the housing around the display, such as a camera, an infrared camera, an ambient light sensor and a user presence detection sensor. Managing all of these factors for manufacture of an information handling system can increase cost and introduce product discrepancies.

SUMMARY OF THE INVENTION

Therefore, a need has arisen for a system and method which supports a display in a portable information handling system housing with an edge-to-edge configuration.

A further need exists for a system and method that supports access by sensors located under an edge-to-edge display of illumination through the display panel.

In accordance with the present invention, a system and method are provided which substantially reduce the disadvantages and problems associated with previous methods and systems for coupling a display in an information handling system housing. A display panel and backlight couple into display module that assembles as a contiguous unit into an information handling system housing with the front glass surface of the display module disposed from edge-to-edge of the housing. A sensor region defined in an inactive area of the display module has treatments that define illumination openings to pass light through the display panel for detection by sensors, such as visual and infrared spectrum cameras.

More specifically, an information handling system processes information with processing components disposed in a portable housing, such as a processor interfaced with a memory that executes an operating system to generate visual images for presentation through a graphics processor at a display integrated in the housing with an edge-to-edge appearance. In one embodiment, the backlight fits into a cavity of a backplate having a flange extension region around an outer perimeter that couples to the bottom surface of a display panel to support the display panel perimeter at the housing perimeter. A cut out in the extension region aligns with a sensor region of the display panel and plural sensors that capture and/or transmit illumination through the display panel. For instance, the sensor region is defined in an inactive area of the display panel that does not present visual images and has a black matrix to define an interior active area of the display at which visual images are presented. The display panel includes a thin film transistor having liquid crystal pixels in the active area to define visual images and coupled to a color filter, such as with an optically clear adhesive. In the inactive area at the outer and inner perimeters an optical sealant disposed between the thin film transistor and color filter reduces light leakage from the display panel active area. Between the optical sealant outer and inner perimeters, an index matching resin is applied to support passage of illumination to sensors under the display panel. Openings formed in the black matrix and aligned with the index matching resin provide access by the sensors for illumination detection. In one embodiment, three sides of the display panel perimeter extend past the backlight backplate and align with the housing perimeter while the fourth side has electronic components of the display, such as a source driver, covered by a bezel that couples over the display at the housing perimeter. In an alternative embodiment, a flip of the display module stack to have the thin film transistor over the color filter provides room under the display to mount the source driver so that bezel is avoided and all four sides of the display panel align with the perimeter of the information handling system housing.

The present invention provides a number of important technical advantages. One example of an important technical advantage is that an information handling system display panel couples to a housing with an edge-to-edge appearance for effective use of the housing footprint and reduction of system weight. A backlight couples to a rear of the liquid crystal display panel with a smaller perimeter than the display panel front glass to fit into a portable housing with the front glass aligned with the housing perimeter. The display module assembles into a housing without a clean room or other special facilities for manufacture of low Z height systems. In cell touch detection avoids the use of a cover glass with integrated touch sensors so that a polarizer upper surface is exposed as the top surface of the display, such as with an anti-glare treatment that provides a glass appearance, although an on-cell touch layer may be used instead of in-cell. An inactive area around the perimeter of the thin film transistor and color filter is treated to reduce light leakage and to include openings in the treatment that pass light through the display panel for sensor disposed under the display panel and hidden from an end user. For instance, a sealant limits light leakage and a black matrix hides the underside of the display module from an end user. Openings in the black matrix having an index matching resin provide the passage of illumination aligned with sensors under the display module in a manner that is not readily discernable by an end user.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A and 5B depict alternative side sectional views of the display panel having different configurations for coupling a source driver to manage presentation of visual images at the thin film transistor;

FIGS. 9 and 9A depict a sectional view of a flip stack display panel configured to have a bezel cover one side with three sides having an edge-to-edge configuration;

DETAILED DESCRIPTION

A portable information handling system integrates a display module having an edge-to-edge configuration and plural sensors configured to access light passed through a display panel in a sensor region disposed at a non-active perimeter of the display panel. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
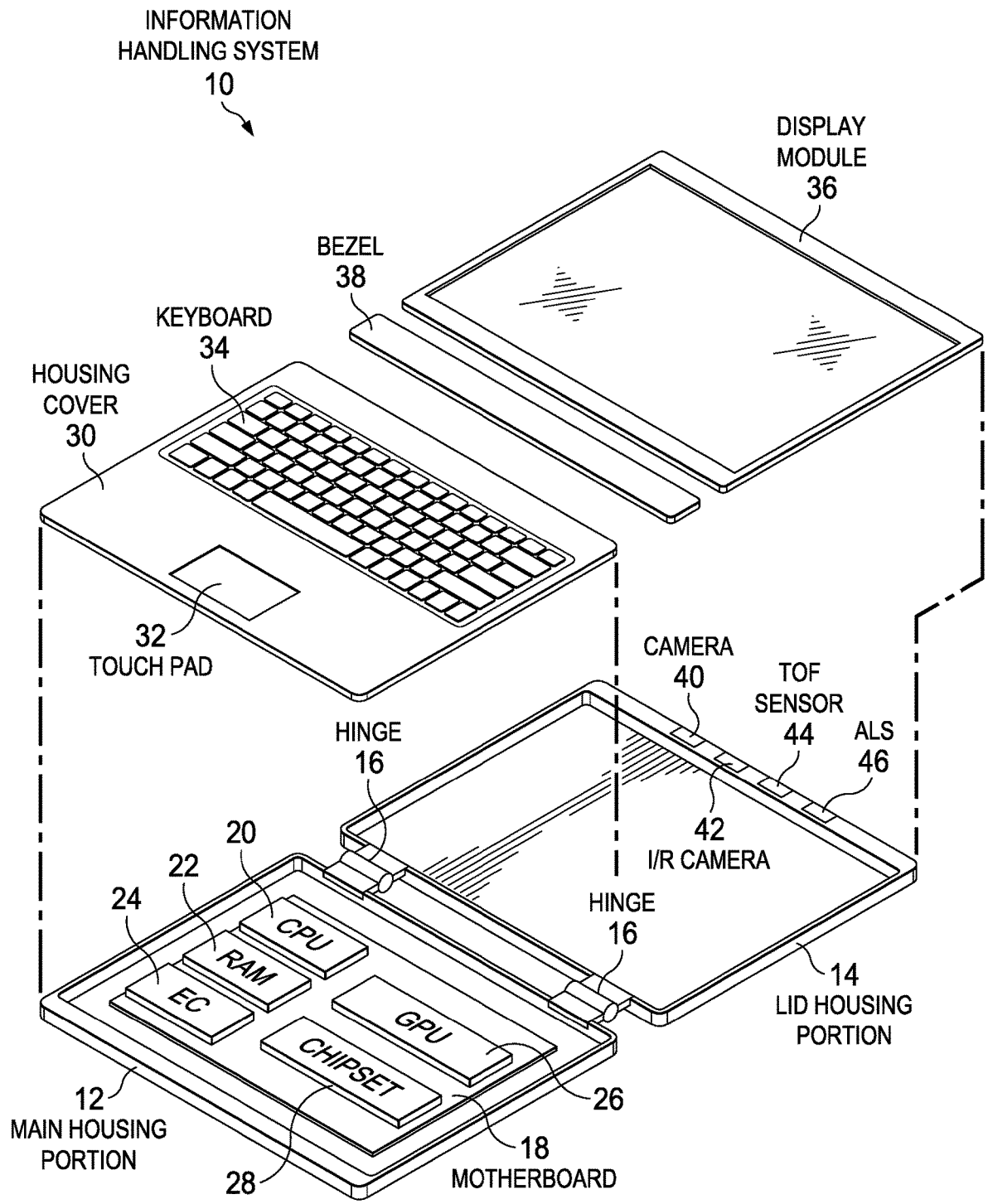
FIG. 1 depicts an exploded perspective view of a portable information handling system that integrates a display module having an edge-to-edge configuration.

Referring now to FIG. 1, an exploded perspective view depicts a portable information handling system 10 that integrates a display module 36 having an edge-to-edge configuration. In the example embodiment, portable information handling system 10 has a main housing portion 12 coupled to a lid housing portion 14 by a hinge 16 that couples opposing brackets on each of the housing portions. Main housing portion 16 includes processing components that cooperate to process information for presentation as visual images at display module 36. For example, a motherboard 18 couples to main housing portion 12 and interfaces processing components through wirelines. A central processing unit (CPU) 20 couples to motherboard 18 and executes instructions that process information in cooperation with a random access memory (RAM) 22 that stores the instructions and information. For instance, an operating system and applications are retrieved from persistent storage, such as a solid state drive, with pre-boot instructions executed by an embedded controller 24 and converted to visual images defined by pixel values with a graphics processor unit (GPU) 26. Embedded controller 24 manages operation of the processing components, such as the application of power, thermal constraints and interactions with input devices, such as a keyboard, mouse, touchpad, sensors and other devices. A chipset 28 supports operation of CPU 20, such as with clock speed control, memory access and graphics coordination. Although the example embodiment depicts a simple configuration that may process information within a portable information handling system, various hardware and software arrangements may be used, such as wireless components that communicate with external network and peripheral device resources.

In the example embodiment, a housing cover 30 couples over main housing portion 12 to cover the processing components. A touchpad 32 disposed over main housing portion 12 accepts touch inputs, such as to move a cursor. A keyboard 34 integrates with housing cover 30 to accept typed inputs. For instance, embedded controller 24 interfaces touchpad 32 and keyboard 34 with CPU 20 to process end user inputs. In addition, embedded controller 24 manages inputs from a variety of sensors configured to sense light that passes through display module 36. A camera 40 captures visual images with a red, green, blue (RGB) sensor, such as to support a video conference. An infrared camera 42 emits infrared spectrum illumination and records reflections with an infrared sensor to capture infrared images, such as to support facial identification and other depth camera features. A time of flight sensor 44 emits infrared spectrum illumination and detects distances based upon reflected infrared energy to determine if an end user is present, such as due to end user movement. An ambient light sensor (ALS) 46 detects ambient light levels, such as to support automated regulation of display image brightness. In the example embodiment, these and other sensors couple to lid housing portion 14 below display module 36 to capture external light through the display panel.

Display module 36 includes a liquid crystal display panel coupled to a backlight and then assembled as a completed unit into lid housing portion 14 to provide an edge-to-edge display configuration. For instance, the length of lid housing portion 14 is substantially equal to the length of display module 36 so that, once assembled, an end user viewing the display is not distracted by a bezel or other extraneous assembly around the perimeter of display module 36. Rather, as is described in greater detail below, the glass surface of display module 36 aligns with the sides of the perimeter of lid housing portion 14. In the example embodiment, a bezel 38 couples over display module 36 to cover one side proximate hinge 16 so that only three sides have the edge-to-edge configuration with the only one side of the width having the display extend to the housing perimeter and the other side of the width having the bezel. For instance, bezel 38 covers a source driver and hinge assembly location, although alternative embodiments as described below provide a four side edge-to-edge configuration that does not have a bezel. In one example embodiment, the perimeter of display module 36 is matched to the shape of lid housing portion 14 by a CNC operation, such as grinding of the display panel edge. The example embodiment has a display disposed over only lid housing portion 14, however, an alternative embodiment may include a display over main housing portion 14 instead of a keyboard so that the information handling system has a dual display configuration.

Figure 2A:
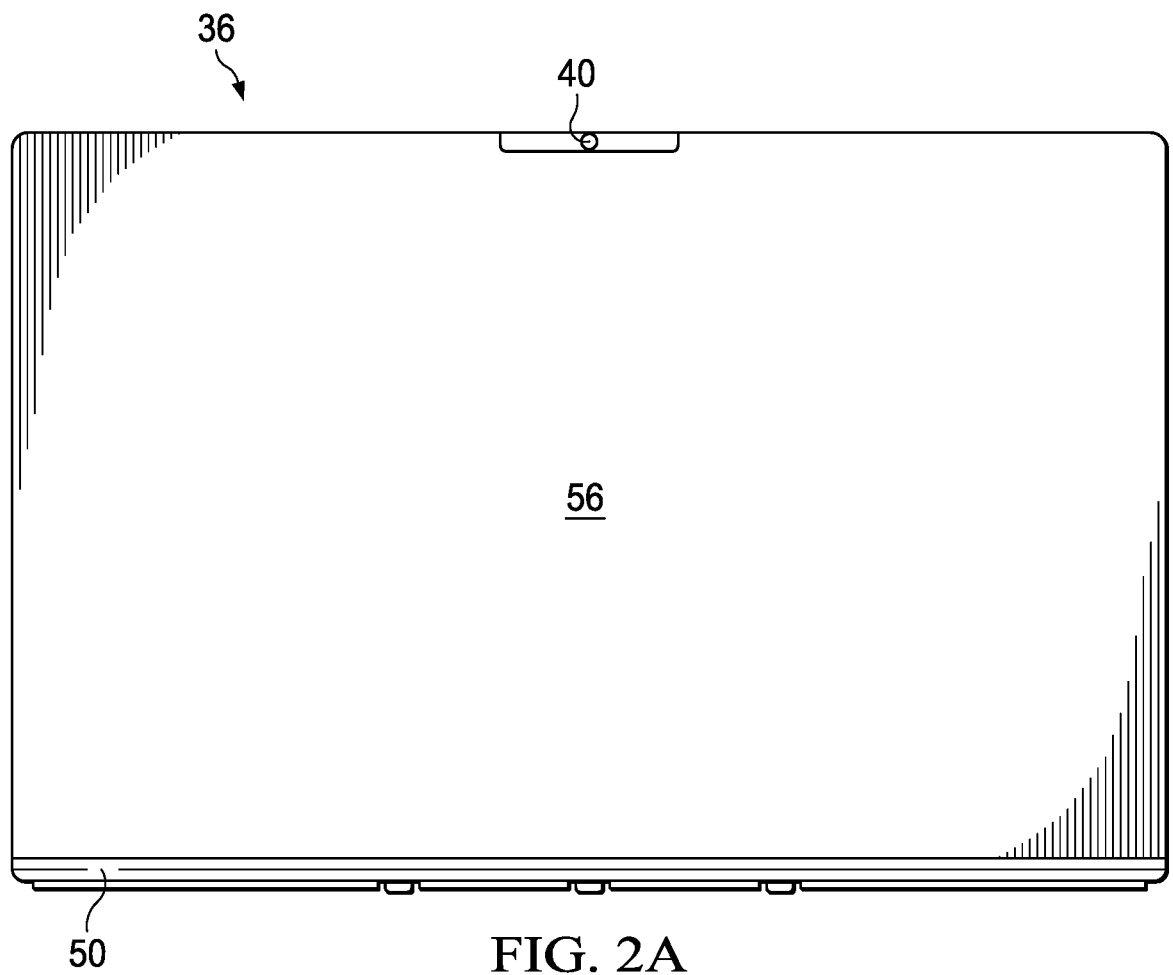
FIGS. 2A and 2B depict an example embodiment of a display module front side with and without a bezel.
Figure 2B:

Referring now to FIGS. 2A and 2B, an example embodiment of a display module 36 front side is depicted with and without a bezel 38. FIG. 2A depicts display module 36 having a central active area in which visual images are generated by liquid crystal pixels integrated in a thin film transistor (TFT) layer and an inactive area around the perimeter of the display and aligned with the perimeter of an underlying housing. At the bottom side of display module 36 a flex cable 90 communicates visual information from a rear side of display module 36 to a source driver of the display panel, such as mounted on the TFT layer or on the cable itself. FIG. 2B depicts bezel 38 coupled to the front bottom side of display module 36 to cover the flex cable and source driver. For example, bezel 38 is a plastic piece that snaps into place over display module 36. At the top side of display module 36, a camera 40 is depicted aligned under the display panel to capture visual images through a sensor region, such as an area of the display panel treated to pass through desired light as set forth in greater detail below.

Figure 3:
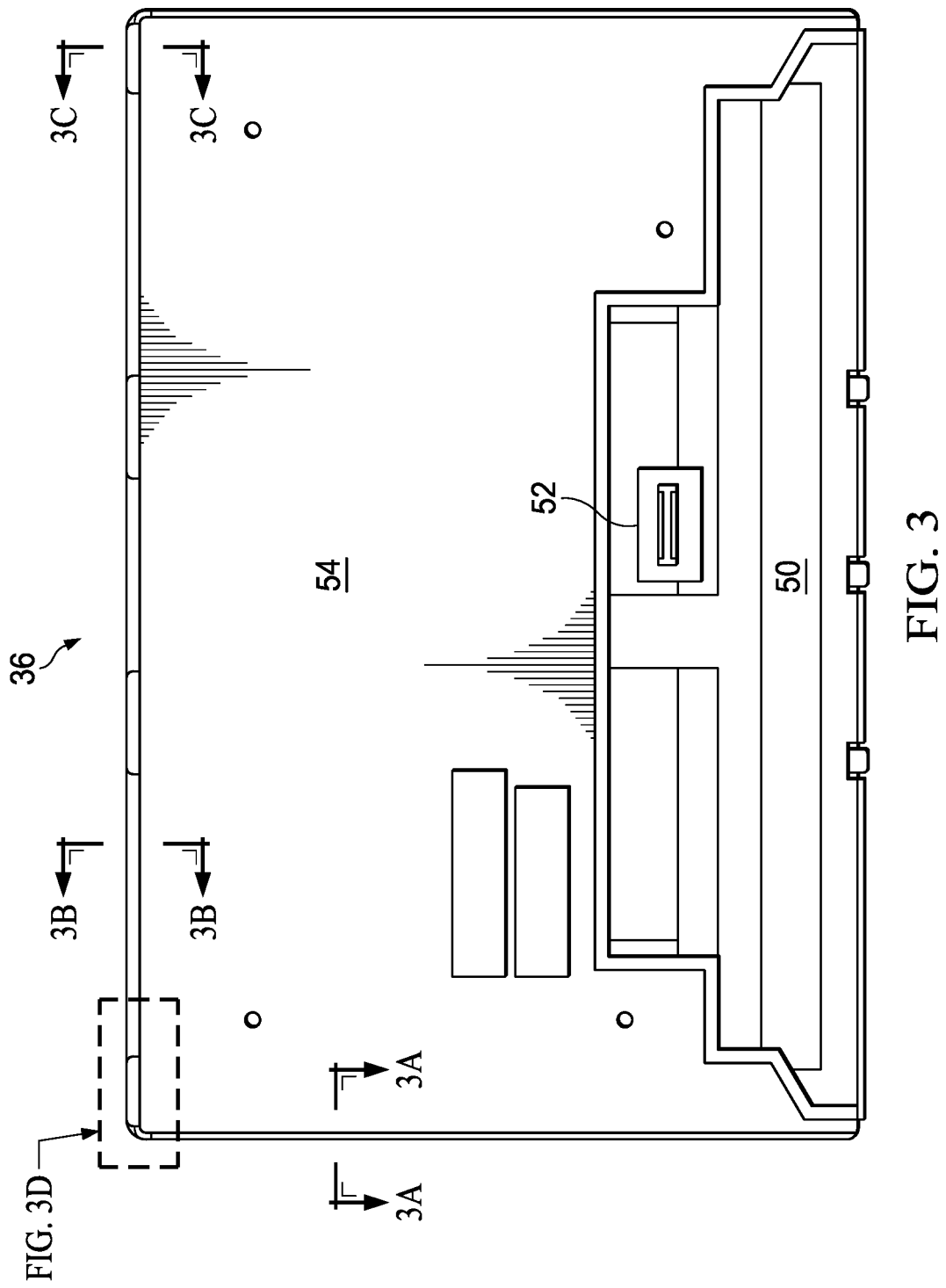
FIGS. 3, 3A, 3B, 3C and 3D depict rear and side views of an example embodiment of a display module integration of a display panel and backlight into a contiguous unit for assembly into an information handling system.
Figure 3A:
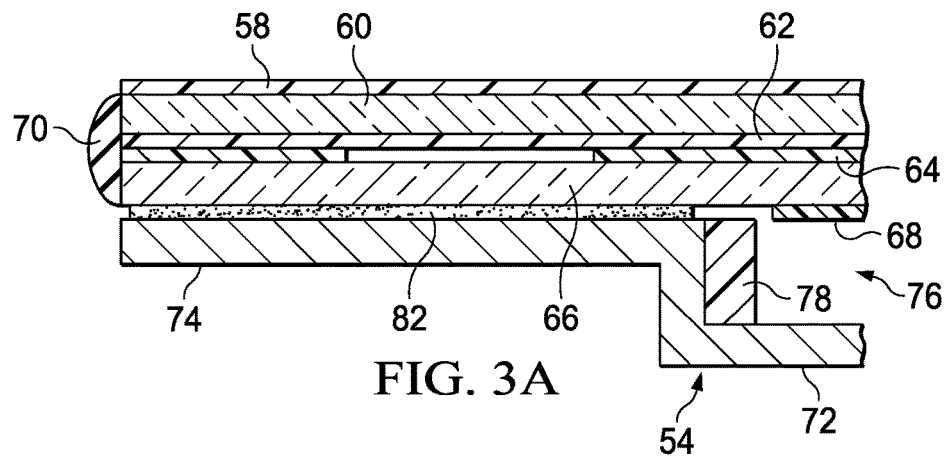

Referring now to FIGS. 3, 3A, 3B, 3C and 3D, rear and side views depict an example embodiment of a display module integration of a display panel 36 and backplate 54 of a backlight 76 into a contiguous unit for assembly into an information handling system. FIG. 3 depicts a rear side of backplate 54 with flexible shield 50 that covers a flexible cable 90 receiving pixel values from liquid crystal display printed circuit board assembly 52. In the example embodiment, backplate 54 provides support at an outer perimeter of the liquid crystal display panel with an extension region 74, such as may be formed by a flange formed around the backlight perimeter and detailed by FIGS. 3A through 3D. FIG. 3A depicts a side sectional view of display module 36 with a display panel 56 (also referred to as a display cell) coupled to a backplate 54 that provides support at the perimeter of the display panel. In the example embodiment, display panel 56 has a polarizer 58 disposed as an upper surface without a cover glass. Polarizer 58 may be treated with anti-glare material or anti-reflective material to provide a matte or glass-like appearance and to provide a glass-like appearance and scratch resistance. Using the polarizer 58 as the display module 36 upper surface reduces the thickness of the display module and assembled lid housing portion and also reduces the system weight. Polarizer 58 is disposed over a color filter 60, which is in turn disposed over a thin film transistor 66 and an underlying bottom polarizer 68. As is set forth in greater detail below, color filter 60 and thin film transistor 66 couple to each other with a variety of types of resin to achieve a desired illumination for presentation of visual images at the upper surface of display panel 56. For example, in an active area that presents visual images an optically clear adhesive 64 may be used in a liquid or tape form to couple color filter 60 to thin film transistor 66 so that visual images generated by the passage of illumination from backlight 76 through thin film transistor 66 pass in turn through color filter 60 for viewing at the surface of polarizer 58. In contrast, inactive areas of display panel 56 may couple with an optically dense resin that forms a black matrix 62 or optically matched resin that passes through illumination as desired to optimize sensor operation for sensors disposed under backlight 76. Further, an edge ink 70, such as a black ink, coupled to the edge of display panel 56 reduces leakage of illumination at the display module 36 outer perimeter.

Figure 3B:
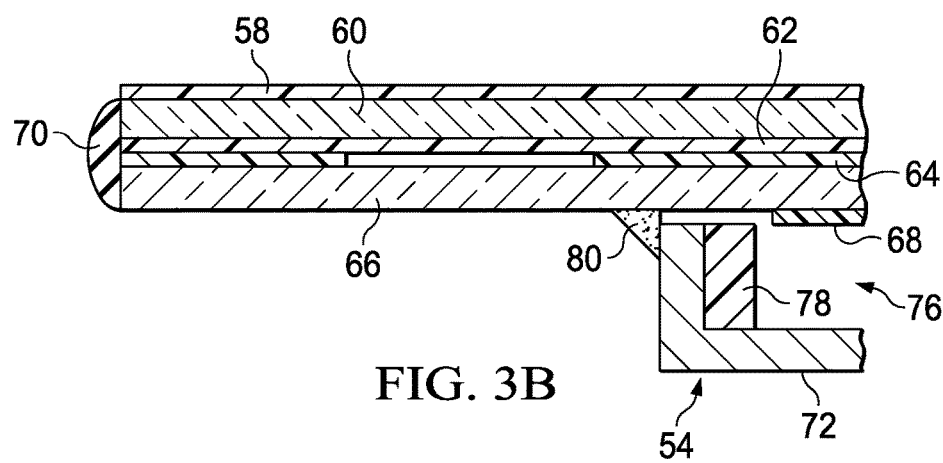
Figure 3C:
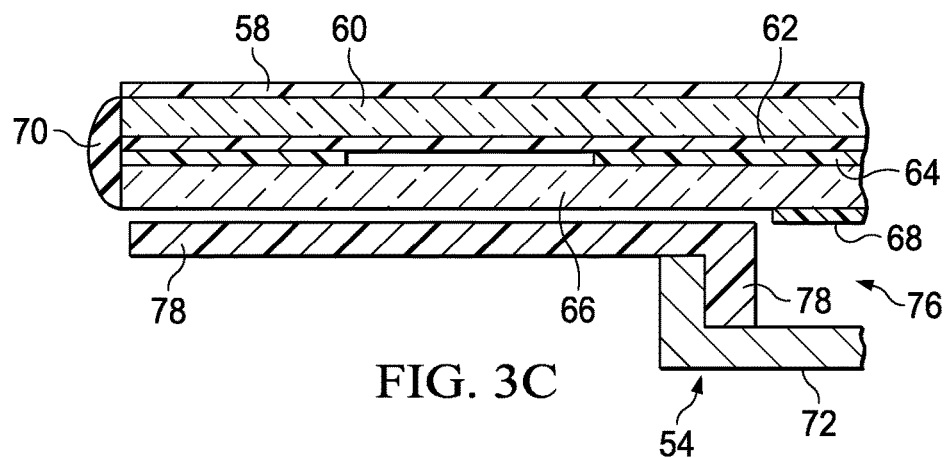
Figure 3D:
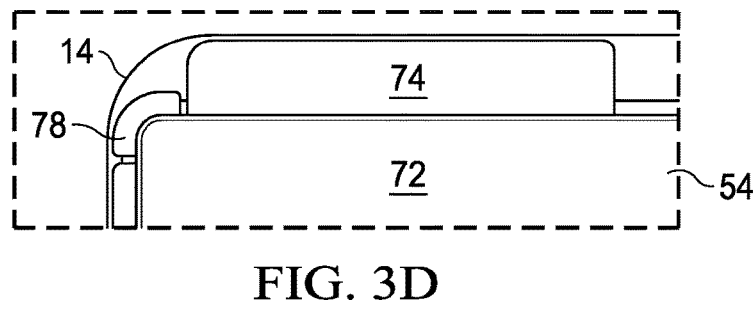

FIGS. 3A, 3B and 3C depict examples of coupling of backlight 54 to display panel 56 in an inactive display area along the display module perimeter to provide structural support and management of illumination presented at the display. FIG. 3A illustrates that backplate 54 is formed to have a cavity region 72 and an extension region 74, such as by stamping a sheet of metal to define cavity region 72 surrounded by a flange to provide extension region 74. Backlight 76 integrates illumination components in cavity region 72 that are held with a backlight frame 84 and aligned to illuminate display 56 at an active area, such as through underlying bottom polarizer 68, as described in greater depth herein. A bottom surface of thin film transistor 66 couples to an upper surface of extension region 74 with an adhesive 82 so that display module 36 has a robust assembly of backlight 76 and display panel 56 to provide a component to assemble as an integral unit in a housing. As is illustrated by FIG. 3, the coupling of extension region 74 with adhesive 82 to the bottom surface of thin film transistor 66 is provided around the perimeter of display module 36 with the exception of some areas that need an alternative arrangement. To prevent leakage of illumination from backlight 76, adhesive 82 may include an optically dense resin that blocks spectrum associated with illumination of backlight 76, such as the red, blue and green spectrum generated by LEDs disposed within backlight 76. FIG. 3B depicts an example embodiment where extension region 74 is cut out from backplate 54 to support placement of sensors that receive illumination through display panel 56 and placement of other components, such as magnets. An optically dense glue 80 couples the bottom surface of thin film transistor 66 to backplate 54 at cavity region 72. For instance, a glue with an optical density of greater than 3 prevents illumination from escaping and helps to couple display panel 56 to backlight 76. FIGS. 3C and 3D illustrate an example embodiment where backplate 54 extension region 74 is missing, such as due to machining at a corner position. To provide support at a missing extension region, a plastic corner support 78 couples to backplate 54, such as in a corner location of display module 36 where sides of backplate 54 intersect. In the example embodiment, plastic corner support 78 is formed as an integral piece with backlight frame 84 and coupled to the bottom surface of thin film transistor 66 with an optically dense adhesive to restrict the escape of illumination.

Figure 4:
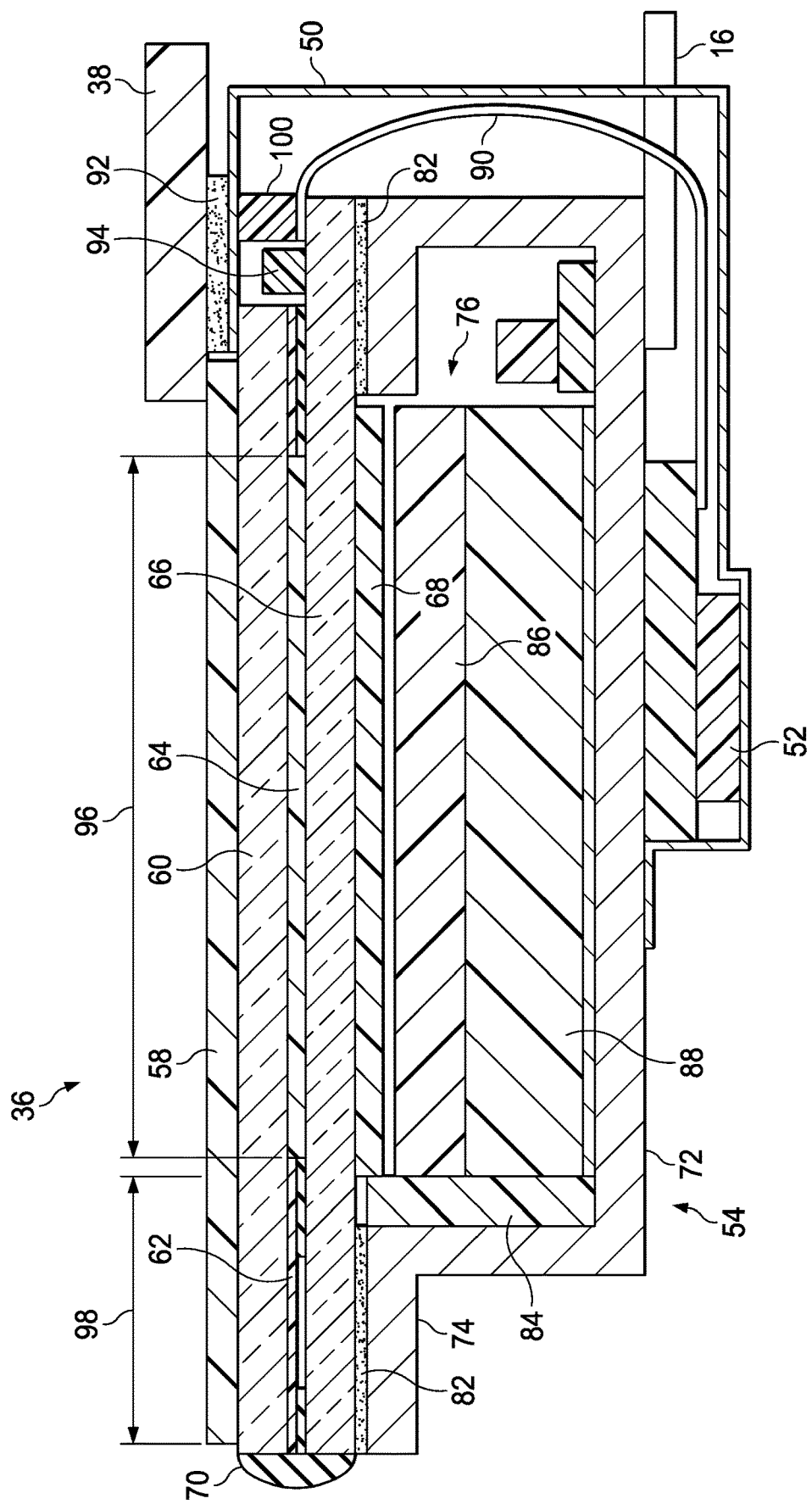
FIG. 4 depicts a side sectional view of display module 36 that illustrates an assembled display module prepared for installation as a contiguous component in an information handling system housing.

Referring now to FIG. 4, a side sectional view of display module 36 illustrates an assembled display module prepared for installation as a contiguous component in an information handling system housing. In the example embodiment, an active area 96 corresponds with a center region of thin film transistor 66 that includes pixels for defining visual images based upon pixel values communicated from a graphics processor through LCD PCBA 52 and flexible cable 90 to a source driver 94 that drives the pixel values. Flexible shield 50 provides EMI shielding for cable 90 and support at the bottom surface of display module 36. Backlight 76 provides illumination through bottom polarizer 68 with an assembly coupled in backlight frame 84. A backlight and light guide plate 88 generates and distributes illumination through backlight films 86 and directs the illumination into display panel 56 through bottom polarizer 68. Backplate 54 holds backlight 76 in cavity region 72 and supports display panel 56 with extension region 74 as discussed above. The upper surface of backlight films 86 may rest over bottom polarizer 68 with a gap or may couple to the lower surface of bottom polarizer 68, such as with an optically clear adhesive that supports passage of backlight illumination out the upper polarizer 58 through active area 96. Around the perimeter of display module 36, adhesive 82 couples display panel 56 to extension region 74 with an optically dense resin to limit illumination leakage along the perimeter from between the display panel and backlight. An end user viewing the display from above will see visual images presented in active area 96 within a central perimeter and a dark frame about the outer perimeter at inactive area 98.

In the example embodiment of FIG. 4, flexible shield 50 couples LCD PCBA 52 to the bottom surface of backplate 54 and around a bracket of hinge 16 that couples the housing portions to each other. Bezel 38 couples to an upper surface of flexible shield 50 with an adhesive 92 and over top of coupling location of source driver 94, which couples to the upper surface of thin film transistor 66. A spacer 100 placed between thin film transistor 66 and bezel 38 provides support to flexible shield 50 and helps to block illumination leakage from thin film transistor 66 out underneath bezel 38. As an example, spacer 100 is a Mylar piece coupled in place with an optically dense adhesive. Although FIG. 4 depicts coupling of backplate 54 extension region 74 to the bottom side of display panel 56, along other sections the arrangements depicted by FIGS. 3-3D may be found. In one embodiment, openings may be machined in extension region 74 to support sensor views. Generally, the field of view of sensors disposed under the perimeter of display module 56 will increase the more closely the sensors are coupled to the front surface of display module 56.

Referring now to FIGS. 5A and 5B, alternative side sectional views of the display panel 56 depict different configurations for coupling a source driver 94 to manage presentation of visual images at the thin film transistor. Both display panels 56 present visual images at an active area and have a black matrix border in an inactive area 98 disposed about the perimeter of display panel and an ink edge treatment 70 to manage light leakage. Both display panels 56 support an edge-to-edge glass appearance on three sides when coupled to a housing while a bezel couples over the side having source driver 94. FIG. 5A depicts source driver 94 coupled to an upper surface of thin film transistor 66 while FIG. 5B depicts source driver 94 coupled to flexible cable 90. Placing source driver 94 on flexible cable 90 reduces the amount of space consumed by the source driver where the bezel couples over the display panel side so that a smaller bezel may be used.

Figure 6:
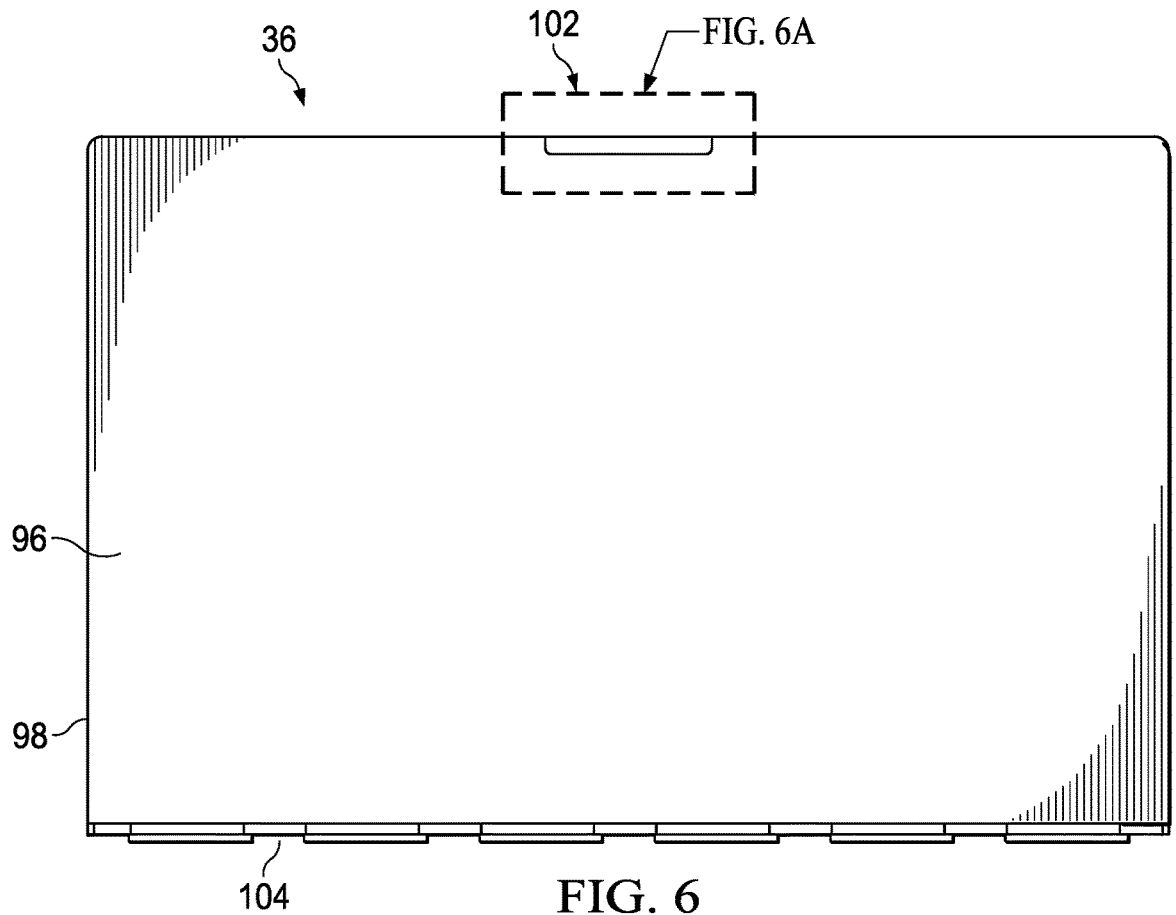
FIGS. 6, 6A, 6B, 6C, 6D, 6E and 6F depict upper and sectional views of a display panel sensor region to illustrate examples of display panel configurations that support sensor operation through the display panel.

Referring now to FIGS. 6, 6A, 6B, 6C, 6D, 6E and 6F, upper and sectional views of a display panel sensor region illustrate examples of display panel configurations that support sensor operation through the display panel. FIG. 6 depicts a top view of a display module 36 having three sides with an edge-to-edge configuration and a fourth side configured to accept a bezel that covers components 104, such as an exposed source driver. A central active region 96 of display module 36 presents visual images with illumination of pixels disposed in a thin film transistor by a backlight coupled below the thin film transistor. An inactive region 98 at the outer perimeter of display module 36 has a black matrix appearance that limits light leakage from the active region and aligns at an outer perimeter with the perimeter of a housing to provide an edge-to-edge appearance on three sides of display module 36. A sensor region 102 disposed along the top side of display module 36 provides access of underlying sensors through the display to external illumination. As described above, the sensors may include RGB cameras, IR cameras, time of flight sensors, ambient light sensors and similar devices.

Figure 6A:
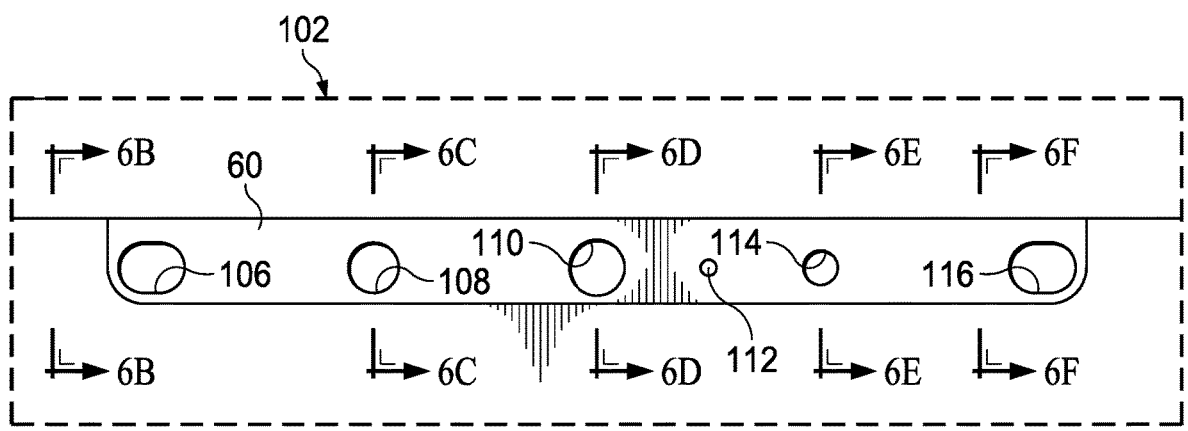

FIG. 6A depicts a close-up view of an example embodiment of sensor region 102 illustrating example configurations for a variety of different types of sensors. In the example embodiment, an upper polarizer 58 is cut out to expose color filter 60 at the upper surface and plural sensor openings are configured with treatments in the display panel to pass illumination through as desired for underlying sensors. As described above, the backplate may be cut out below the sensor region and sealed with optically dense glue; alternatively holes may be machined through the backplate flange extension that align with the sensor openings as shown. An IR LED opening 106 has a treatment to allow infrared illumination to pass from an IR light source under the display panel out to the front of the display panel, such as to support a time of flight sensor or depth camera that use infrared reflections. An IR sensor opening 108 has a treatment to allow infrared illumination to pass from external the display panel to a sensor disposed under the display, such as an IR depth camera or time of flight sensor. An RGB sensor opening 110 has a treatment to allow visible spectrum illumination to pass from external the display panel to an RGB camera disposed under the display panel that captures visual images. A status LED opening 112 has a treatment to allow illumination associated with the status LED to pass through the display panel for viewing from the front of the display panel, such as a white light to indicate activation of an RGB camera. An ALS opening 114 has a treatment to allow illumination associated with ambient light external to the display to pass through the display to an ambient light sensor. A second IR LED opening 116 has a treatment to pass infrared illumination from within the housing and out the display, such as to support a second IR sensor. In various embodiments, sensor openings of sensor region 102 may have index matching resin that manages what spectrum of illumination passes through, such as by linking the infrared spectrum of different sensors to individually-matched resins.

Figure 6B:
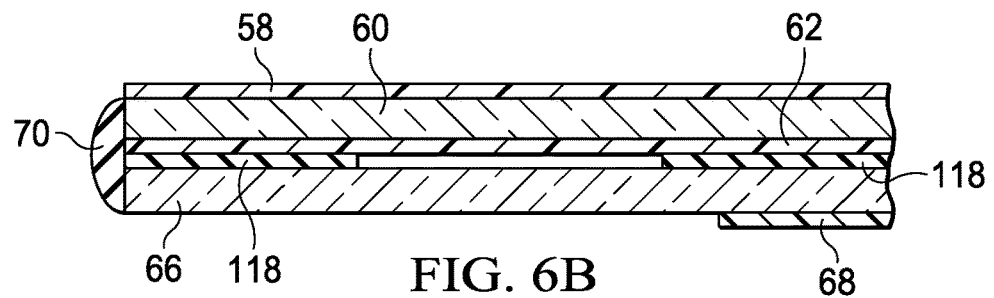

Sectional views of the example openings identified in FIG. 6A are depicted in FIGS. 6B-6F to illustrate treatments applied at the sensor openings to pass desired illumination through display module 36 based upon the type of sensor exposed at each opening. FIG. 6B depicts a sectional view of an inactive area of the display panel outside of the sensor region where an end user sees a black border around the active area of the display panel. A top polarizer 58 extends over a color filter 60 and thin film transistor 66 to the perimeter of the display panel where edge ink 70 blocks illumination from escape at the side of the display panel. A black matrix 62 is visible to an end user from a top viewing position through top polarizer 58 with the black matrix extending from the outer perimeter of the active area to the outer perimeter of the display panel at edge ink 70. Black matrix 62 may be provided with a variety of different materials, such as a black or other opaque ink, a dark paint, a dark tape, a deposited material, etc . . . Under black matrix 62 is a sealant 118 that has a opaque characteristic to block passage of illumination from the backlight located under bottom polarizer 68. For example, such sealants are commercially available from LG and other vendors. In the example embodiment, sealant 118 is disposed at an inner perimeter of the inactive area and an outer perimeter of the inactive area so that a central region does not have sealant 118. In an alternative embodiment, sealant 118 may be placed across the entire inactive area and removed or not deposited where sensors are located.

Figure 6C:
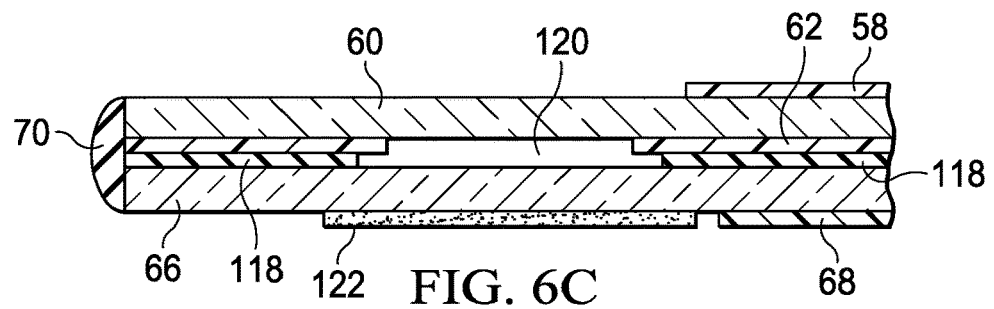
Figure 6D:
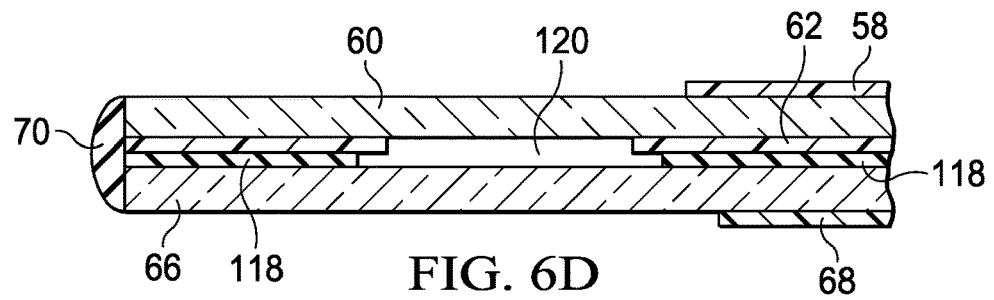
Figure 6E:
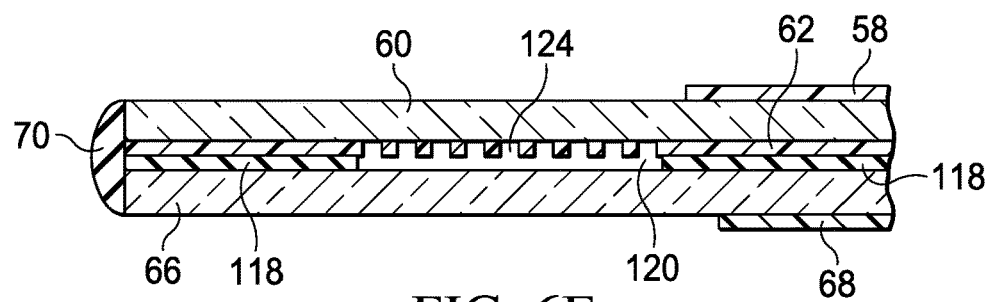
Figure 6F:
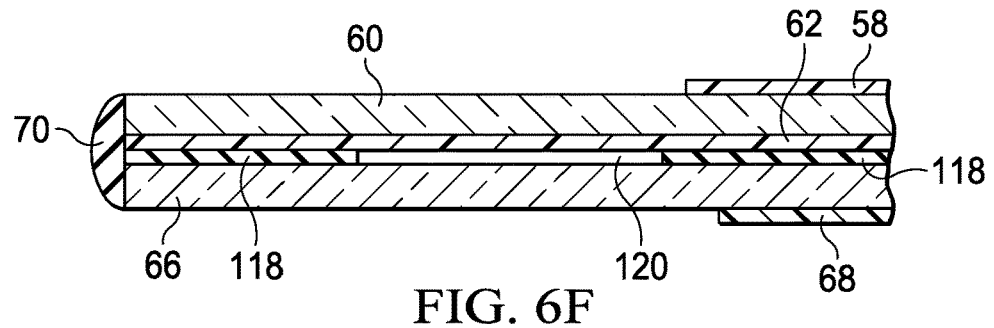

FIG. 6C depicts sensor region 102 with an opening defined through black matrix 62 to support passage of infrared illumination, such as for use with IR LED openings 106 and 116 and IR sensor 108. In sensor region 102, upper polarizer 58 is cut out, such as by a laser cutter before application to color filter 60. An index matching resin is disposed in the opening of black matrix 62, such as a resin that has the same refraction index as glass so that refraction distortion is eliminated. In some embodiments the index matching resin may pass the desired illumination while blocking spectrum outside of the desired range. In an embodiment where infrared matching resin is used, blocking the visual spectrum may allow the sensor opening to remain difficult to see relative to black matrix 62. In addition, an infrared ink 122 is disposed in alignment with the index matching resin to further filter illumination to a desired spectrum. For example, different infrared sensors may use different parts of the infrared spectrums so that infrared ink 122 can help to reduce noise for the sensors. In one example embodiment, one infrared ink may focus on a spectrum of 850-940nm while another infrared ink focuses on 450-650nm to shield out visible light but allow infrared light to pass. FIG. 6D depicts sensor region 102 with an opening for an RGB sensor, such as a visual spectrum camera, with an index matching resin disposed in an opening formed in black matrix 62. For example, the opening supports passage of visible light to a webcam disposed under display module 36 to capture a video conference. Alternatively, the opening may support illumination of a visible spectrum LED from below display module 36 for viewing by an end user, such as a white LED to indicate camera usage. FIG. 6E depicts sensor region 102 with a patterned opening 124 in black matrix 62 that allows ambient light to pass through while also supporting a subdued appearance of the opening. The patterned opening 124 may also support passage of light from an underlying LED. In both examples, the brightness of the ambient light or illuminated light is adjusted for the amount of light allowed to pass through the pattern. FIG. 6F depicts a sectional view of the display module 36 in sensor region 102 where black matrix 62 is disposed across the entire inactive region without an opening for a sensor.

Figure 7:
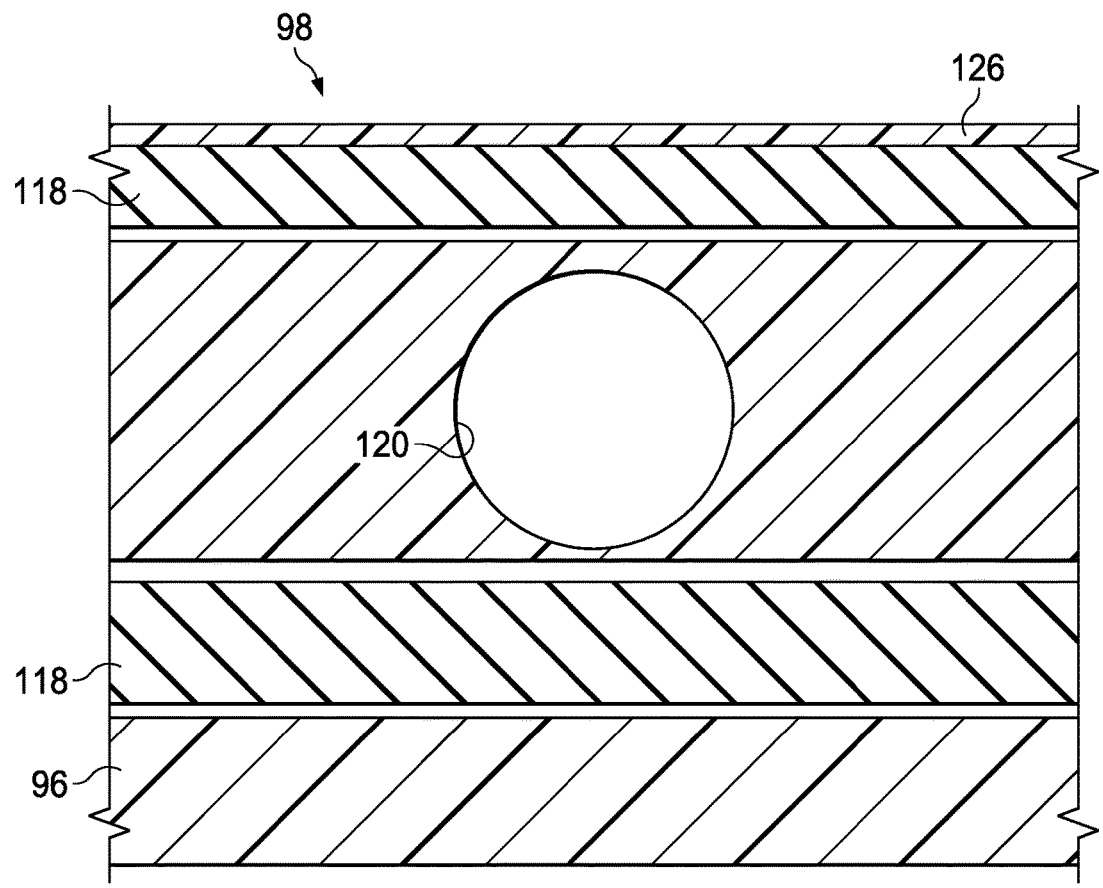
FIG. 7 depicts an upper view of the sensor region 102 of an example embodiment with dimensions of an inactive area of the display and sensor opening.

Referring now to FIG. 7, an upper view of sensor region 102 depicts an example embodiment with dimension of an inactive area of the display and sensor opening. In the example embodiment, a 0.3 mm space is provided between active area 96 and sealant 118 at the inner perimeter of inactive area 98. In active area 98 has a total width of 5 mm and includes a black matrix opening having a 2.1 mm diameter located in the index matching resin 120. Index matching resin 120 is located in a 2.75 mm thick central part of inactive area 98, which is, for example, an ultraviolet activated resin, so that the center of the opening is 2.75 mm from active area 96. Sealant 118 at the outer perimeter of inactive area 98 is initially disposed with a 1 mm thickness and a 0.325 gap to sealant 118, and then the outer perimeter is ground or otherwise machined to obtain a desired edge-to-edge fit at the housing, such as to a 0.7 mm width. A black ink 126 of 0.025 mm thickness is disposed along the edge of the display to limit leakage of light from the side of the display panel. Alternate embodiments may use varied dimensions for the sealant, black matrix and index matching resin to achieve a desired image presentation at the display module.

Figure 8:
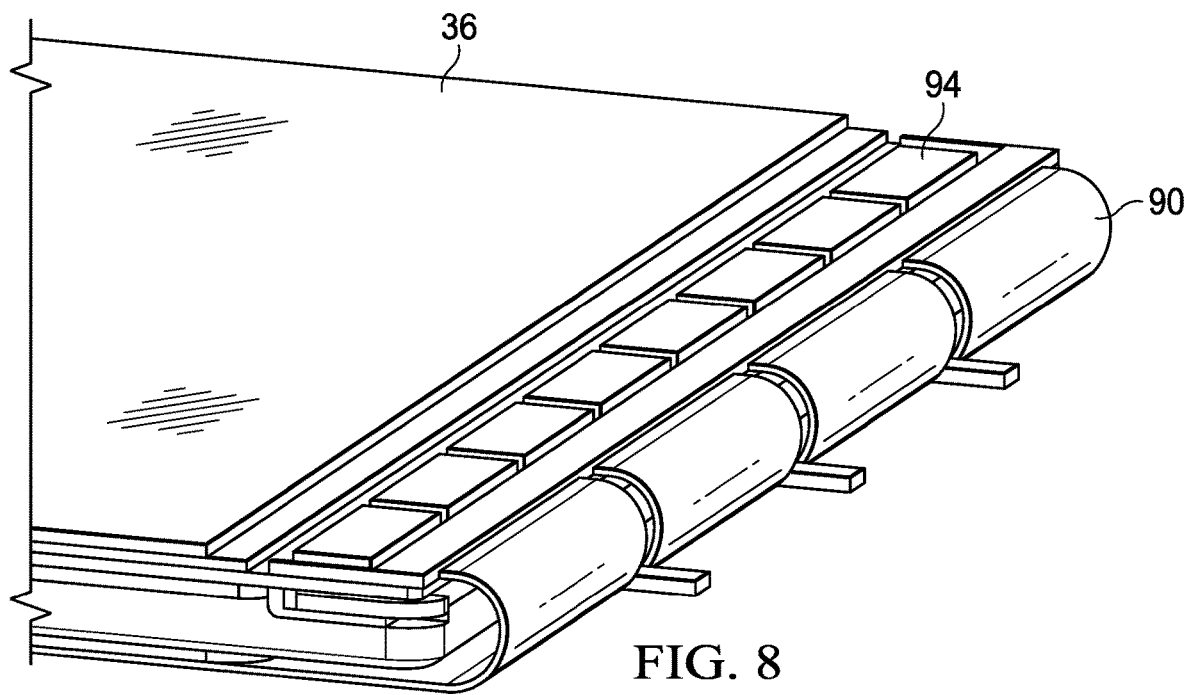
FIG. 8 depicts a side perspective view of an alternative embodiment of display module based in part upon a flip of the stack of components in a display panel as detailed by FIG. 9.

Referring now to FIG. 8, a side perspective view depicts an alternative embodiment of display module 36 based in part upon a flip of the stack of components in a display panel as detailed by FIG. 9. In the example embodiment, flexible circuit 90 interfaces with source drivers that scan pixel values to a thin film transistor coupled within the display panel on top of a color filter. A bezel 38 couples over flexible circuit 90 to cover the side of display module 36 that has exposed components. FIG. 9 depicts that thin film transistor 66 is disposed over color filter 60 and interfaced with source driver 94 to accept visual image information that defines pixel values. Flipping the vertical positioning of thin film transistor 66 and color filter 60 provides greater flexibility in the disposition of source driver 94, as is described in greater detail below. Upper polarizer 58 couples over thin film transistor 66 and is the upper surface of display module 36 from the edge with edge ink 70 to underneath bezel 36. FIG. 9A depicts an alternative edge covering in the place of edge ink 70 where an edge ultraviolet activated application underlies upper polarizer 58 to provide extension of upper polarizer 58 over the end of thin film transistor 66.

Figure 10:
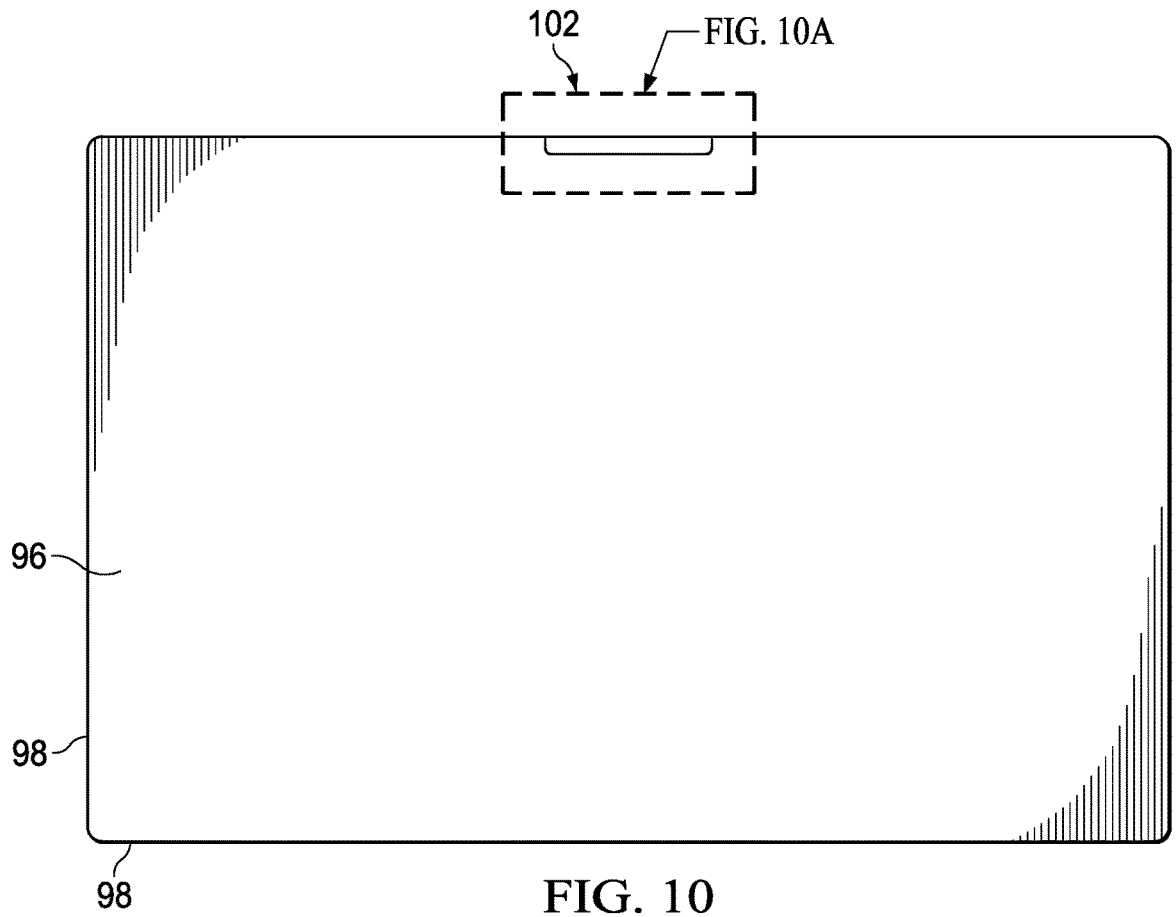
FIGS. 10, 10A, 10B, 10C, 10D, 10E and 10F depict upper and sectional views of an example embodiment of the display module configured with a flip stack of the thin film transistor and color filter to support a four sided edge-to-edge display configuration.
Figure 10A:
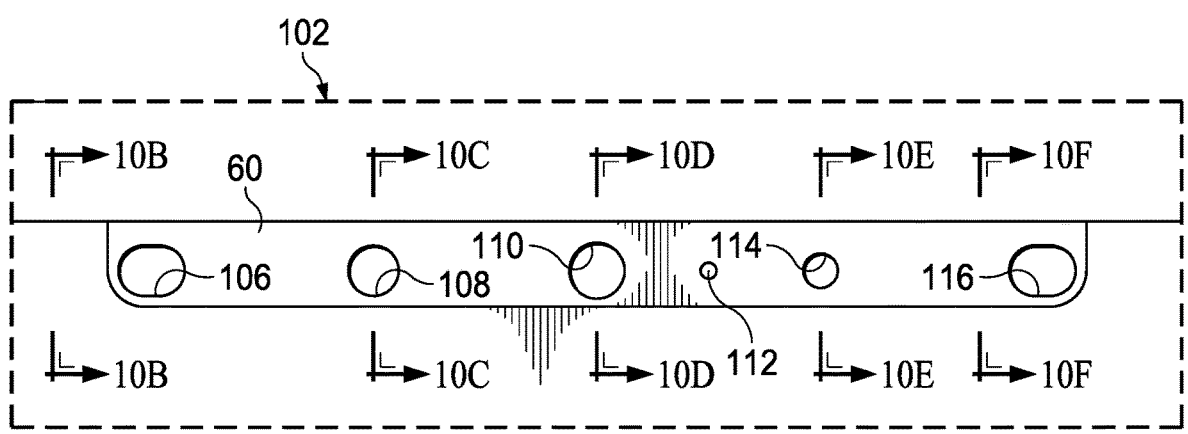
Figure 10B:
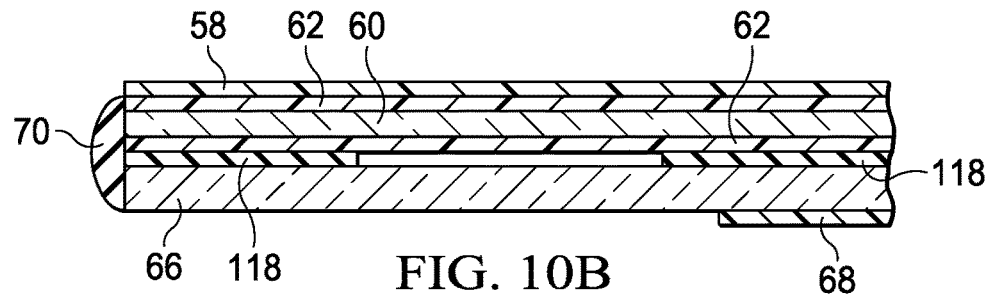
Figure 10C:
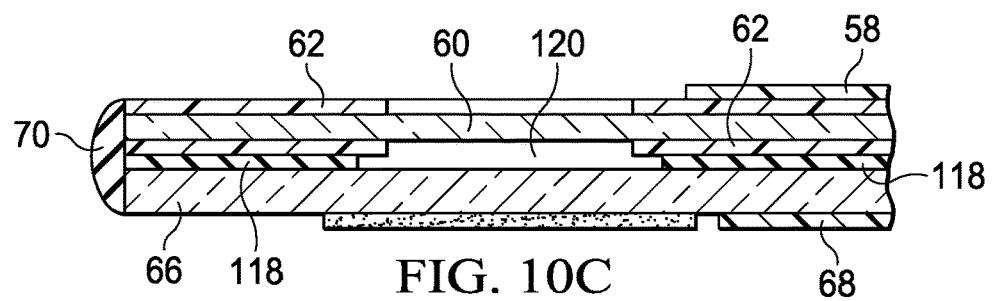
Figure 10D:
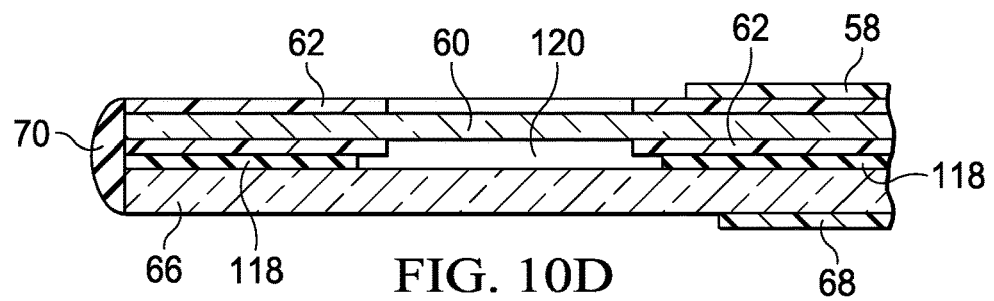
Figure 10E:
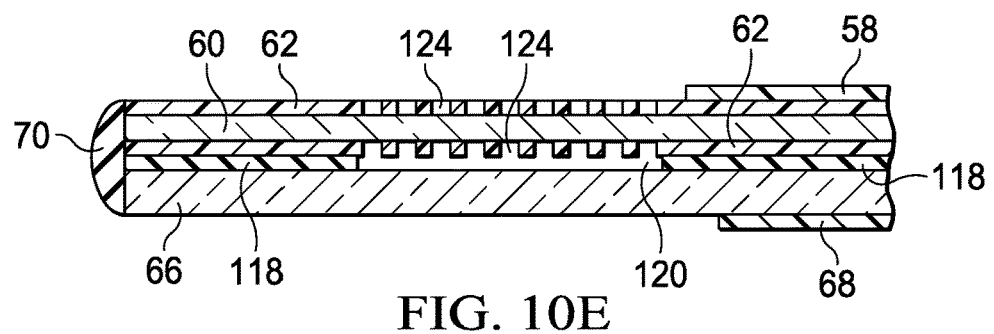
Figure 10F:
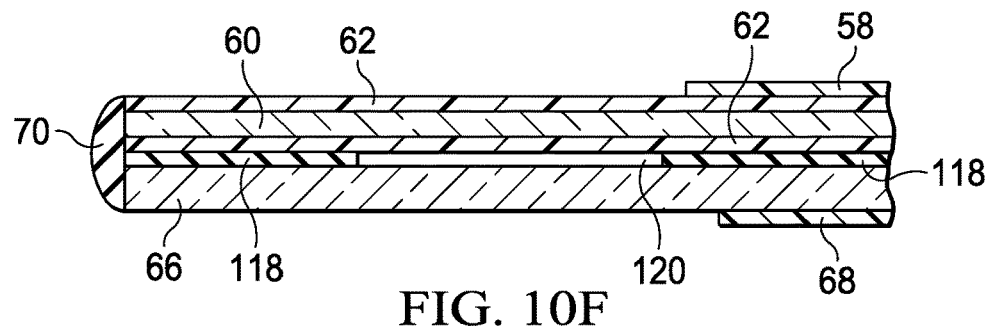

Referring now to FIGS. 10, 10A, 10B, 10C, 10D, 10E and 10F, upper and sectional views depict an embodiment of the display module configured with a flip stack of the thin film transistor and color filter to support a four-sided edge-to-edge display configuration. FIG. 10 depicts a top view of display module 36 coupled to a housing to have the display perimeter inactive area 98 extend to the perimeter of the housing and include sensor region 102 that provides access by sensors underlying display module 36 to external illumination. FIG. 10A depicts a top view of sensor region 102 with thin film transistor 66 exposed at a cut out of upper polarizer 58 and openings formed in the black matrix to support sensor illumination access. The example embodiment depicts an IR LED opening 106, an IR sensor opening 108, an RGB sensor opening 110, a status LED opening 112, an ambient light sensor opening 114 and a second IR LED opening 116. FIGS. 10B through 10F depict examples of openings provided in black matrix 62 that support sensor access to illumination through display module 36. FIG. 10B depicts a non-sensor inactive area having a first black matrix 62 disposed between upper polarizer 58 and thin film transistor 66 and a second black matrix 62 disposed between color filter 60 and thin film transistor 66. Dual layers of black matrix 62 manage illumination for the flip stack configuration by avoiding leakage through thin film transistor 66 where illumination is distributed in an even manner through the active area. Sealant 118 is disposed about the outer and inner perimeters of the inactive area as described above. FIG. 10C depicts an IR sensor and IR LED opening in both black matrix 62 layers with index matching resin 120 and infrared ink 122 as describe above. Within sensor region 102, black matrix 62 on the upper surface of thin film transistor 66 is exposed at the display module upper surface where upper polarizer 58 is cut out. FIG. 10D depicts an RGB sensor opening, such as to support a web camera or other visual spectrum camera, with an opening in both layers of black matrix 62 and an index matching resin disposed between thin film transistor 66 and color filter 60. FIG. 10E depicts an ambient light sensor and status LED opening having a patterned opening 124 in both layers of black matrix 62 to pass ambient light through index matching resin 120. FIG. 10F depicts sensor region 102 having dual layers of black matrix 62 with a cut out of upper polarizer 58 so that the upper surface of display module 36 in the inactive region 98 is the upper black matrix layer disposed over the thin film transistor.

Figure 12A:
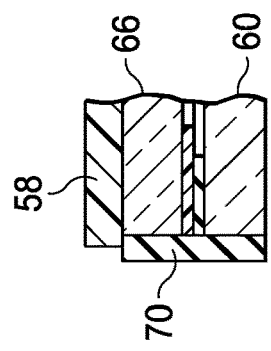
FIGS. 12 and 12A depict an example display panel with a flip stack of the thin film transistor and color filter having a bottom-mounted source driver.
Figure 11:
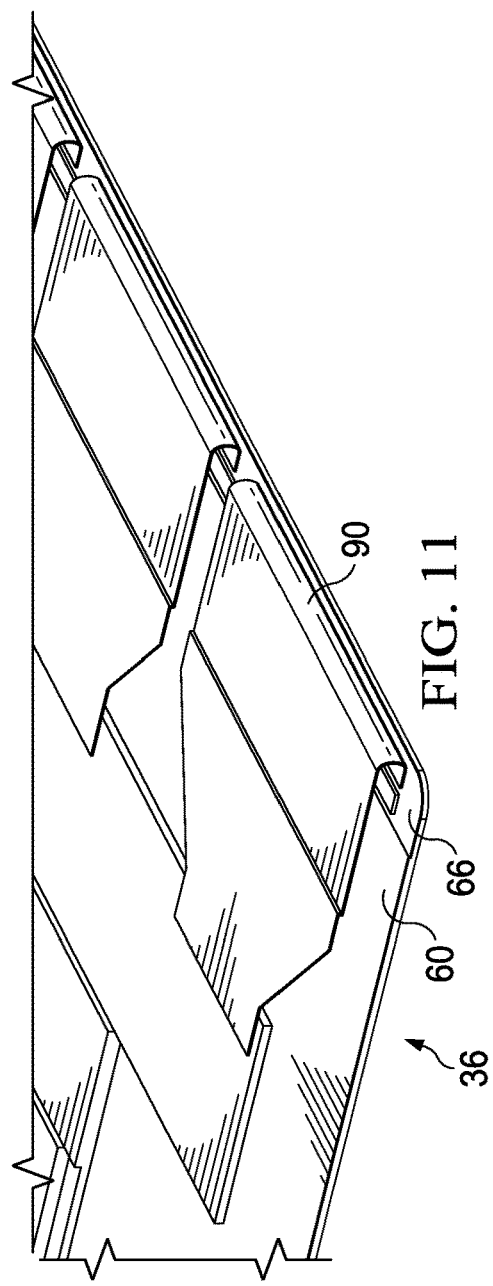
FIG. 11 depicts a bottom perspective view of an example of the display panel configured with a flip stack of the thin film transistor and color filter as shown by FIG. 12 to support a four-sided edge-to-edge display configuration.
Figure 12:
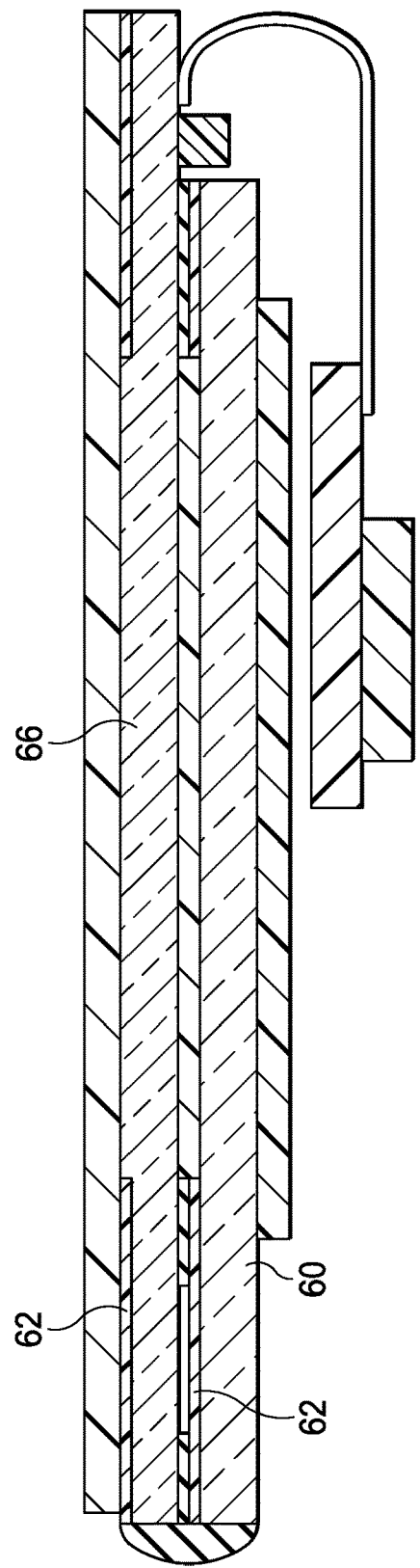

Referring now to FIG. 11, a bottom perspective view depicts an example of the display panel configured with a flip stack of the thin film transistor 66 and color filter 60 as shown by FIG. 12 to support a four-sided edge-to-edge display configuration. In the example embodiment, display module 36 couples thin film transistor 66 over color filter 60 to mount source driver 94 to the bottom surface of thin film transistor 66. Flexible circuit 90 interfaces source driver 94 with the LCD PCBA underneath thin film transistor 66 at the inactive area 98 where a shorter length of color filter 60 provides space for the mounting of source driver 94. At the lower surface of display module 36, flexible circuit 90 fits under the display surface to hide the electronic components and connections without an overlying bezel. A black matrix 62 between upper polarizer 58 and thin film transistor 66 blocks viewing of the coupling of source driver 94 at the inactive area. Along the other sides of the display, both color filter 60 and thin film transistor 66 have a black matrix 62 to define the inactive area as the display perimeter. Edge ink 70 blocks leakage of illumination out of the side of the display along the side of the display module. In the example embodiment, the display side surface where source driver 94 mounts does not have the edge ink due to its position at the housing hinge. In an alternative embodiment the edge ink may also be included on the bottom display side surface. FIG. 12A depicts an alternative embodiment for blocking leakage of illumination with an edge ultraviolet coating. The ultraviolet activated coating couples under an extension of upper polarizer 58 so that the display edge has a more robust and clear appearance.

Although the present invention has been described in detail, it should be understood that various changes, substitutions and alterations can be made hereto without departing from the spirit and scope of the invention as defined by the appended claims.

What is claimed is:
1. An information handling system comprising:
   a housing having at least one housing portion, the at least one housing portion having a rectangular shape with a housing portion perimeter of four sides;
   a processor disposed in the housing and operable to process information;
   a memory disposed in the housing and operable to store the information; and
   a display module having a display panel coupled over backlight by a backplate, the backplate coupled to the at least one housing portion, the display panel having an upper surface that extends to the housing portion perimeter at three or more of the sides and an active area that generates visual images within a visual image perimeter of less than the housing portion perimeter, the backlight disposed under the display panel and aligned with the visual image perimeter, the backplate having a cavity region sized to accept the backlight and an extension region extending from the visual image perimeter to the housing portion perimeter proximate a bottom surface of the display panel;

wherein the display panel has a polarizer layer at an outer surface disposed over a thin film transistor layer that generates the visual images and a color filter layer coupled to a bottom side of the thin film transistor layer, the visual images communicated to the thin film transistor layer through a source driver coupled to the bottom side of the thin film transistor layer outside of the visual image perimeter.

2. The information handling system of claim 1 further comprising:
  a sensor disposed in the housing portion under the extension region and aligned to capture visual images through the display panel along a sensor axis;
  wherein the extension region has an opening formed at the sensor axis.

3. The information handling system of claim 2 wherein the sensor comprises a camera operable to capture visual images.

4. The information handling system of claim 2 wherein the sensor comprises an infrared camera.

5. The information handling system of claim 2 wherein the sensor comprises an ambient light sensor.

6. The information handling system of claim 2 wherein the sensor comprises a user presence detection sensor.

7. The information handling system of claim 2 wherein the backplate couples to the display panel at the extension region opening with optically dense glue that blocks passage of illumination from the backlight to the extension region.

8. The information handling system of claim 1 wherein:
  the backlight has a plastic frame; and
  the backlight upper surface and plastic frame couple to the display panel lower surface with an optically clear adhesive.

9. The information handling system of claim 1 further comprising an extension frame coupled to the backplate extension region at one or more corners defined by the three sides.

10. A display module comprising:
  a backplate having a central cavity region and a flange extension region, the flange extension region disposed along at least three sides of the backplate;
  a backlight disposed in the central cavity and operable to generate illumination; and
  a liquid crystal display panel disposed over the backplate and the backlight, the liquid crystal display panel having a perimeter that aligns along three sides with the at least three sides of the backplate, the liquid crystal display panel having an active area aligned with the backlight that generates visual images illuminated by the backlight and having an inactive area aligned with the flange extension area, the liquid crystal display generating the visual images with a thin film transistor layer, the illumination passing through a color filter at a bottom side of the thin film transistor layer and then through the thin film transistor layer, the visual images communicated to the thin film transistor layer through a source driver coupled to the bottom side of the thin film transistor layer in the inactive area.

11. The display module of claim 10 wherein the flange extension region has one or more openings to provide a sensor view through the liquid crystal display panel, the flange extension region coupled to the liquid crystal display panel proximate the opening with an optically dense adhesive.

12. The display module of claim 10 further comprising:
  an optically clear adhesive disposed between the backlight upper surface and the liquid crystal display panel lower surface at the active area; and
  an optically dense adhesive disposed between the flange extension region upper surface and the liquid crystal display panel lower surface at the inactive area.

13. The display module of claim 10 further comprising:
  one or more corner supports coupled to one or more corners defined by the at least three sides of the backplate; and
  a bezel disposed over the liquid crystal display panel at a fourth side of the backplate.

* * * * *